United States Patent
Midorikawa et al.

[11] Patent Number: 5,995,576
[45] Date of Patent: Nov. 30, 1999

[54] INHIBITION OF RADIOACTIVE MATERIAL DEPOSITION IN PRIMARY COOLANT STRUCTURE OF NUCLEAR POWER PLANT

[75] Inventors: Yuuji Midorikawa; Yoshiyuki Saitoh, both of Sendai; Takeshi Sakai, Izumiohtsu; Teruchika Kikuchi, Sakai, all of Japan

[73] Assignees: Tohoku Electric Power Co., Ltd., Miyagi, Japan; Nuclear Fuel Industries, Ltd., Tokyo, Japan

[21] Appl. No.: 09/169,643

[22] Filed: Oct. 9, 1998

[30] Foreign Application Priority Data

Oct. 13, 1997 [JP] Japan .................................. 9-293199

[51] Int. Cl.$^6$ .................................................. G21C 19/00
[52] U.S. Cl. ............................................................ 376/306
[58] Field of Search ................................... 376/305, 306, 376/904, 906

[56] References Cited

U.S. PATENT DOCUMENTS

| 4,756,874 | 7/1988 | Ruiz et al. | 376/306 |
| 5,377,245 | 12/1994 | Uetake et al. | 376/306 |

FOREIGN PATENT DOCUMENTS 3-14155  2/1991  Japan .

*Primary Examiner*—Daniel D. Wasil
*Attorney, Agent, or Firm*—Frishauf, Holtz, Goodman, Langer & Chick, P.C.

[57] ABSTRACT

A mixture of metal ions is added to the primary cooling water of a water-cooled nuclear reactor to inhibit deposition of radioactive materials in the cooling water on the inner surfaces of pipes. The mixture of metal ions added to the cooling water introduced into the primary cooling system simultaneously comprises two to four of the metal ions, Mn ion, Mg ion, Ni ion and Zn ion, one of these ions being manganese ion.

9 Claims, 3 Drawing Sheets

INHIBITION OF RADIOACTIVE MATERIAL DEPOSITION IN PRIMARY COOLANT STRUCTURE OF NUCLEAR POWER PLANT

BACKGROUND OF THE INVENTION

1. Field of the Invention

The present invention relates to a method of inhibiting radioactive material deposition in the primary coolant structure of a nuclear power plant, and in particular relates to inhibiting the deposition of materials, especially materials containing $^{60}$Co and other radioactive cobalt materials on, for example, cooling water vessels, ducts, inner walls of water delivery equipment and inner surfaces of pipes in boiling water reactors and pressurized water reactors.

2. Description of the Related Art

In nuclear power stations using water-cooled reactors, radioactive materials contained in the primary cooling water may deposit on the inner wall surfaces of the pipes or of the primary coolant structure, and this leads to an increase of spatial dose rate in the primary cooling system.

When the primary coolant structure of the nuclear power station, for example the inner walls of cooling water vessels (pressure vessels), pipes, pumps and valves come in contact with cooling water at high temperature, corrosion products or dissolved substances are produced. These become radioactive due to bombardment with neutron radiation in the reactor, and are recycled in the primary cooling system together with the cooling water. During recirculation through the primary cooling system, the radioactive materials are deposited on the inner walls of pressure vessels, pipes or pumps, and the radiation dose rate in the system rises. The deposition of these radioactive materials, in particular $^{60}$Co which has a relatively long half-life (5.3 years), is undesirable in view of the need to reduce exposure of workers to radiation during shutdown of the nuclear power station, e.g. for regular inspection purposes.

Various methods may be envisaged to suppress increase of the radiation dose rate due to deposition of radioactive materials in the primary coolant structure of a water-cooled reactor. This may be done by inhibiting the production of radioactive materials (inhibiting corrosion of structures), localizing the radioactive materials where they are produced (the core), eliminating radioactive materials from cooling water (purification), inhibiting deposition of radioactive materials to structural surfaces, and elimination of the depositing radioactive materials (polishing, cleaning).

In U.S. Pat. No. 4,756,874 granted to Ruiz et al, a method is described for removing or inhibiting accumulation of radioactive cobalt on the surfaces or structural members by adding zinc ions to the cooling water of the water-cooled reactor.

However in this prior art patent, secondary radiation is produced due to radioactive conversion of the $^{64}$Zn isotope contained in the cooling water (the natural occurrence of $^{64}$Zn is 48 %, and the half-life of the $^{65}$Zn produced by radioactive conversion is 244 days). Therefore it was necessary to separate and remove $^{64}$Zn, and the high cost of this separation process was an obstacle to its practical application.

In addition to the above patent, another method is reported in Japanese Examined Patent Publication No. Hei 3-14155 where at least one metal ion chosen from the group Mg, Cr, V, Ti, Cu, Ni, Zn, Cd is added to the cooling water of the water-cooled reactor. However in the method described in this Japanese patent, there are difficulties from the viewpoint of maintaining the safety of the nuclear power station due to the following unresolved problems. That is, Cu accelerates corrosion in nickel-based alloys. Cd is a neutron absorbing material and toxic to man. Ti and V cannot exist as bivalent metal ions in cooling water and the mechanism by which they inhibit deposition of radioactive cobalt is unknown; moreover, the corrosive action they have on structural materials is unclear.

In view of the above situation, a new technique was required wherein the effect of secondary radiation could be ignored, and wherein there was no need for concern about adverse effect on structural materials.

SUMMARY OF THE INVENTION

It is therefore an object of the present invention to provide a practical method for inhibiting deposition of radioactive materials in a primary coolant structure so as to minimize the risk of exposing workers to radiation, and to effectively inhibit the deposition of radioactive materials on the inner surfaces of cooling water receptacles, pipes, valves and water delivery equipment in the primary coolant structure without causing inner surface corrosion of these structural parts. It is a further object of the present invention to provide a method of this type wherein there is no need for concern about production of secondary radiation due to metal ions added to the cooling water, and wherein total costs are largely reduced.

The present invention provides a method for inhibiting radioactive material deposition in the primary coolant structure of a water-cooled nuclear power station, wherein a mixture of metal ions simultaneously containing two to four types of metal ions is added to the cooling water to be introduced into the primary coolant system, said mixture of metal ions containing manganese ion and at least one metal ion selected form the group consisting of magnesium, nickel and zinc ions, and said cooling water containing manganese ion and at least one metal ion selected from the group consisting of magnesium ion, nickel ion and zinc ion is circulated through the primary coolant structure.

According to a preferred embodiment of the present invention, said mixture of metal ions to be added to the cooling water contains the three metal ions, i.e., manganese ion, magnesium ion and nickel ion.

According to another preferred embodiment of the present invention, said manganese ion is $^{55}$Mn ion, the magnesium ion is $^{26}$Mg ion, and the nickel ion is $^{58}$Ni ion.

According to still another embodiment of the present invention, said primary coolant structure comprises a member made of zinc, zinc alloy or a material which contains zinc, and the zinc ion present in the cooling water is zinc ion which has dissolved into the cooling water from said member.

According to still another embodiment of the present invention, said mixture of metal ions to be added to the cooling water further contains zinc ion, and preferably $^{64}$Zn ion.

According to still another embodiment of the present invention, the concentration of zinc ion and preferably $^{64}$Zn ion, in the primary cooling water is limited to a maximum of 1 ppb.

The substances produced from the primary coolant structure, for example the inner walls of cooling water vessels (pressure vessels), pipes, pumps and valves, due to contact with the cooling water are of two types, i.e., ions and particles. The ionic products are co-deposited as an oxide or introduced into an oxide film by isotope substitution reactions when the oxide film is formed on the surface of the structural materials; the particle products, on the other hand, are deposited by electrostatic attraction or gravitational deposition on the surface of the structural materials.

According to the present invention, manganese ion and at least one metal ion of magnesium ion, nickel ion and zinc ion coexist in the cooling water to which the mixture of metal ions is added. Due to the synergistic effect of these metal ions, there is a greater tendency for the mixture of metal ions to be incorporated in the oxide film on the inner surface of the structural members. The composition of the oxide film is thereby controlled, and co-deposition of ionic $^{60}Co$ is inhibited. In addition, the interfacial electrokinetic potential (zeta potential) is controlled by this mixture of metal ions so that deposition of particulate radioactive materials including $^{60}Co$ is prevented.

Of the four types of metal ions used in the present invention, three are also metal components of structural members, i.e., manganese, nickel and zinc, and in most nuclear power stations, very small amounts of them are often dissolved in the primary cooling water. Also, magnesium may be introduced as a trace impurity into cooling water from supply water or the like. In either case, it has been confirmed that these metal ions have almost no corrosive action on structural members. Consequently, these four metal ions are not detrimental to structural members, so they could not possibly corrode structural members even if they are added to cooling water to inhibit deposition of radioactive materials.

As for generation of secondary radioactivity due to conversion of substances in cooling water, of the above metal ions, the half-life of metal isotopes except zinc is short, so even if deposits are produced, the radiation level dissipates in a short time. This means that workers will not be exposed to excessive radiation levels during maintenance inspections if a predetermined time is allowed to elapse after reactor shutdown.

For zinc, as the half-life of $^{65}Zn$ is as long as 244 days, the generation of secondary radioactivity can be suppressed to negligible levels far below normal levels by reducing its addition amount to cooling water to the minimum. The meaning of reducing the zinc addition amount here refers to minimizing the zinc ion concentration in primary cooling water when Zn containing structural materials are used for the condenser, etc., of the primary cooling system, and based on water quality data for cooling water, it is preferably limited to a maximum of 1 ppb. In nuclear power stations which use Zn alloy structural materials for the condenser, minute amounts of Zn inevitably enter the cooling water due to corrosion of the condenser, but the effect of $^{65}Zn$ at this concentration level is usually small enough to be ignored.

According to the present invention, when Zn containing structural materials are used for the condenser of the primary cooling system, there is no need to add zinc ion to the mixture of metal ions. Zinc ion should only be added to the mixture of metal ions when zinc containing structural material is not used for the condenser.

The following Table 1 shows types of radioactive nuclei produced by the aforesaid four metal ions suitable for the present invention, and their half-lives.

TABLE 1

| Metal ion (isotope composition %) | Generating reaction | Cross-sec. area (barn) | Generated nucleus | Half-life |
|---|---|---|---|---|
| $^{26}Mg$ (11.3) | (n,γ) | 0.0382 | $^{27}Mg$ | 9.5 min |
| $^{55}Mn$ (100.0) | (n, γ) | 13.3 | $^{56}Mn$ | 2.6 hrs |
| $^{58}Ni$ (67.8) | (n, p) | 0.349 | $^{58}Ni$ | 70.8 days |
| $^{64}Zn$ (48.9) | (n, γ) | 0.78 | $^{65}Zn$ | 244 days |

The above and other features and advantages of the present invention will become apparent from the following description of the preferred embodiments of invention together with the appended drawings, which are however given only as examples and should not be construed as limiting the technical scope of the invention in any way.

DESCRIPTION OF THE PREFERRED EMBODIMENTS

Figure 1:
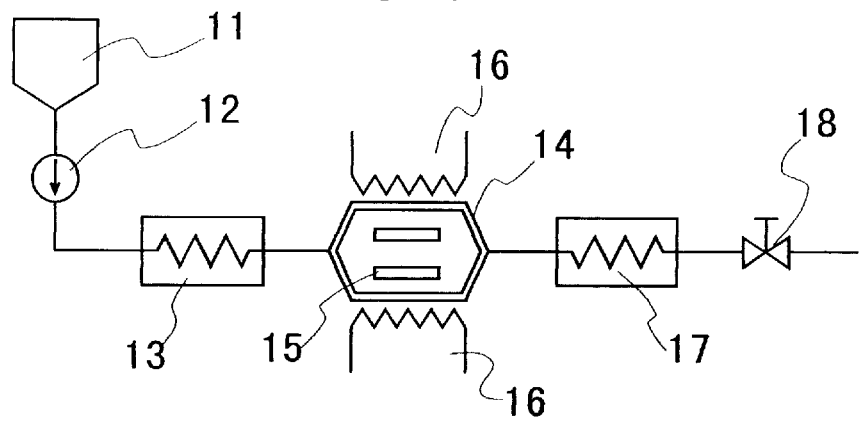
FIG. 1 shows a schematic structure of a test apparatus simulating a high temperature primary cooling water flow system of a nuclear power station for the purpose of testing the method of the present invention.
Figure 2:
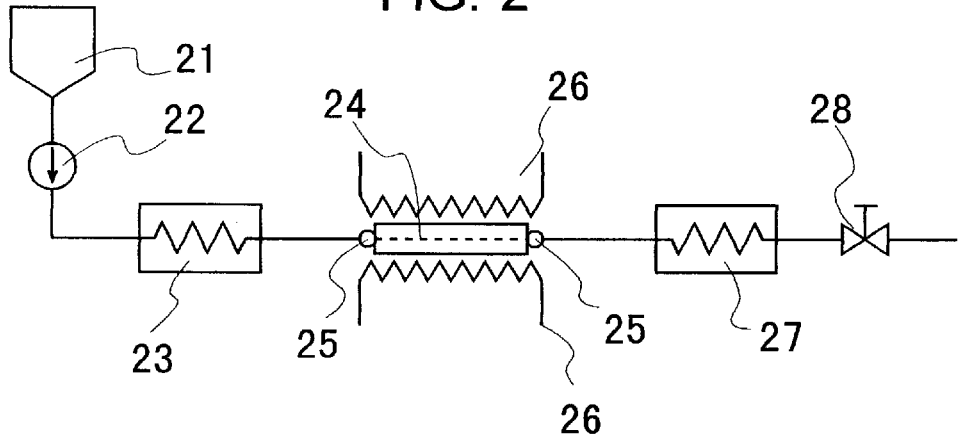
FIG. 2 shows a schematic structure of another test apparatus simulating a high temperature primary cooling water flow system of a nuclear power station for the purpose of testing the method of the present invention.

The test apparatuses shown in FIG. 1 and FIG. 2 comprise different cooling water flow systems simulating a high temperature water environment of a nuclear power station for the purpose of confirming the effect of the method according to the present invention. In the test apparatus shown in FIG. 1, a deposition amount of cobalt ion on the surface of a sample of the same material as a piping material was measured for the case where no metal ions were added to the cooling water and the case where various metal ions were added to the cooling water. In the test apparatus shown in FIG. 2, an interfacial electrokinetic potential level (zeta potential) was measured in the same way for a sample A of the same material as the piping, and a sample B simulating cobalt oxide deposited on the surface of the piping.

The construction of the test apparatus shown in FIG. 1 and the experimental method using this apparatus will now be simply described. In this test apparatus, a tank 11 for holding a test solution corresponding to cooling water, a high-pressure pump 12, a pre-heater 13, an autoclave 14, a cooler 17 and a regulating valve 18 are connected in series. The test solution in the tank 11 is fed to the autoclave 14 by the high pressure pump 12 through the pre-heater 13, and the test solution which has passed through the autoclave 14 is discharged to the outside via the regulating valve 18. The pressure of the cooling liquid in the autoclave 14 is adjusted by the regulating valve 18 to be a high pressure of the same order as the pressure in the primary coolant system of an actual reactor. A specimen 15 of the same material as the piping used in the primary coolant system of an actual reactor is arranged in the autoclave 14, and the exterior of the autoclave is maintained at a high temperature (280° C.) by a heater 16.

The amount of cobalt deposited on the specimen 15 in the autoclave 14 was measured when the test solution was passed through the test apparatus for a predetermined time, and differences appearing in the cobalt deposition amount when metal ions were not added to the test solution as compared to when various metal ions were added to the test solution, were examined.

For the four types of metal ions added to the test solution, Mn, Mg, Ni were each adjusted to lie within a range of approximately 5 to 50 ppb and Zn was adjusted to be a maximum of approximately 1 ppb in the case of separate addition. In the case of mixed addition, Zn was likewise adjusted to be a maximum of approximately 1 ppb, while the total amount containing Mn, Mg and/or Ni was adjusted to lie within a range of approximately 5 to 50 ppb. The cobalt ion concentration in the test solution was maintained to be always constant (approximately 3 ppb).

Next, the test apparatus shown in FIG. 2 and experimental method using this apparatus will be simply described. In this test apparatus, a tank 21 for holding a test solution corresponding to cooling water, a high pressure pump 22, a pre-heater 23, a capillary tube 24, a cooler 27 and a regulating valve 28 are connected in series. The test solution in the tank 21 is fed to the capillary tube 24 by the high pressure pump 22 through the pre-heater 23, and the test solution which has passed through the capillary tube 24 is discharged to the outside via the regulating valve 28. Two types of capillary tube are provided, i.e. a capillary tube made of the same sample material A as is used for the piping of the primary coolant system of an actual reactor, and a capillary tube made of a cobalt sample material B simulating cobalt oxide deposited on the surface of the piping, and these tubes are used selectively according to the nature of the experiment to be performed. In both capillary tubes, a white platinum electrode 25 is attached to both ends, and when it is installed, the capillary tube is maintained at a high-temperature (280° C.) by an external heater 26. During the test, the inner surface of the cobalt capillary tube is cobalt oxide due to the action of the high temperature test solution.

The zeta potential was computed from the measured values of the electric potential between the platinum electrodes 25 at both ends when the flow rate of the test solution was altered by the high pressure pump 22, and the effect of adding various metal ions on the zeta potentials of the piping sample A and the cobalt oxide sample B was examined.

The concentrations of the four types of metal ions added to the test solution were adjusted so that Mn, Mg, Ni were each within a range of approximately 5 to 50 ppb and Zn was a maximum of approximately 1 ppb in the case of separate addition. In the case of mixed addition, Zn was likewise adjusted to be a maximum of 1 ppb, while the total amount containing Mn, Mg and/or Ni was adjusted to be within a range of approximately 5 to 50 ppb.

Figure 3:
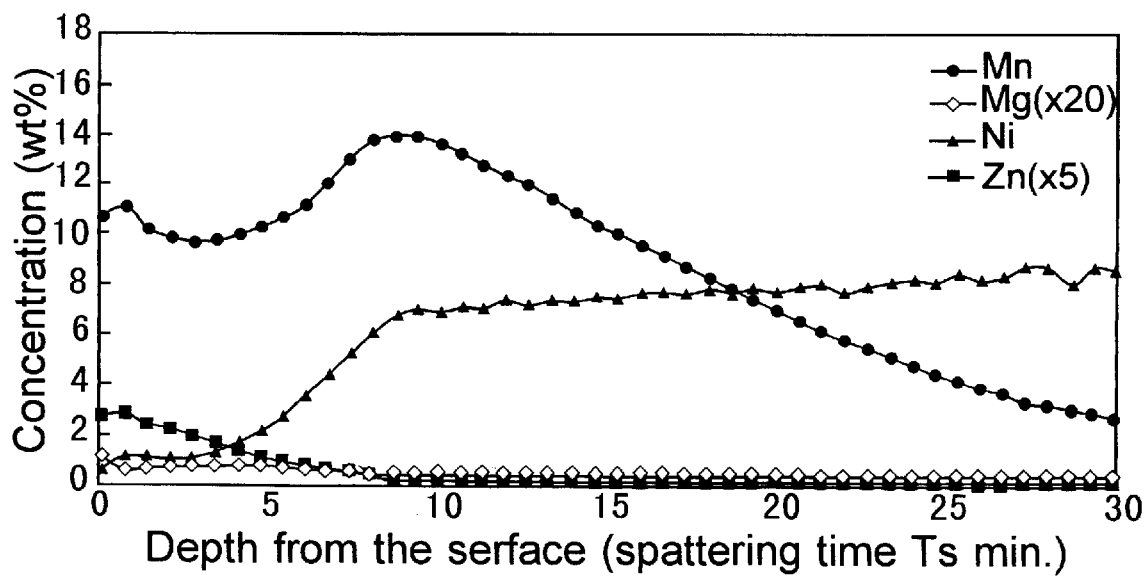
FIG. 3 is a graph showing amounts of metal ions in an oxide film on the surface of a pipe specimen measured in an experiment using the test apparatus shown in FIG. 1, in which the abscissa indicates a sputtering time Ts (min) representing a depth from the surface of the film, and the ordinate indicates measured concentrations (wt %) of metal ions in the oxide film.
Figure 4:
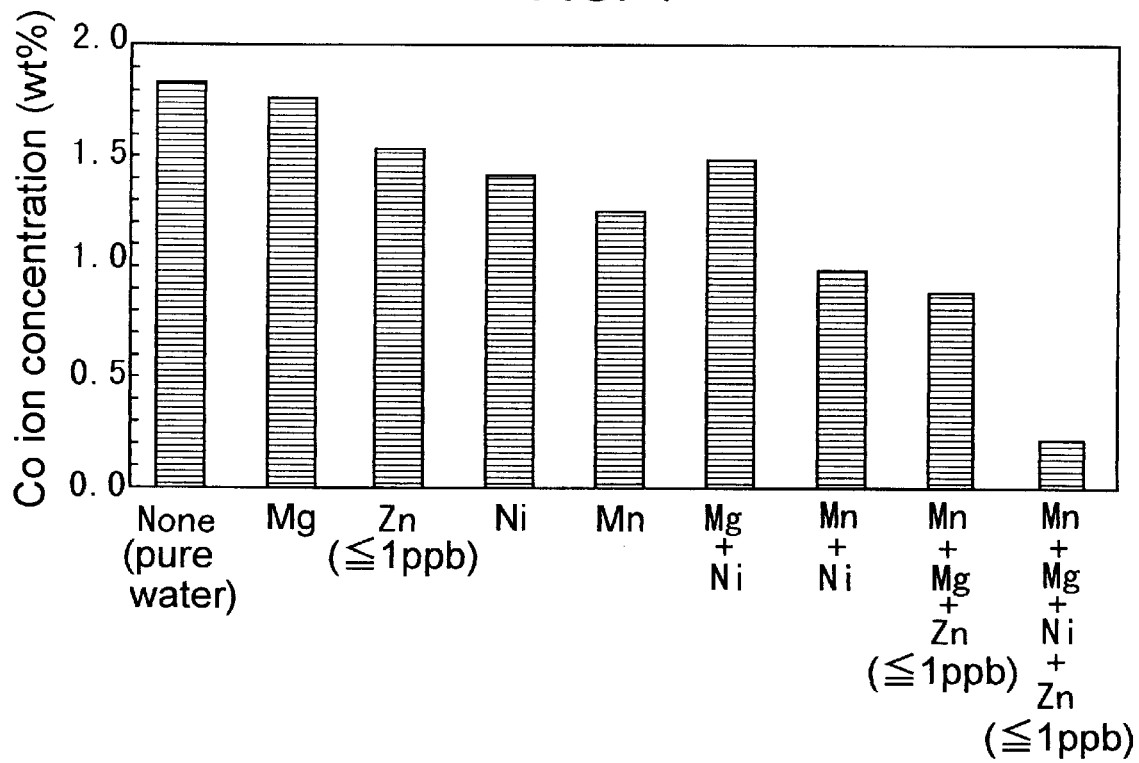
FIG. 4 is a graph showing the amount of cobalt in an oxide film on the surface of a piping specimen measured in various experiments by the test apparatus shown in FIG. 1, in which the abscissa shows types of substances added to cooling water, and the ordinate indicates cobalt ion concentration (wt %).
Figure 5:
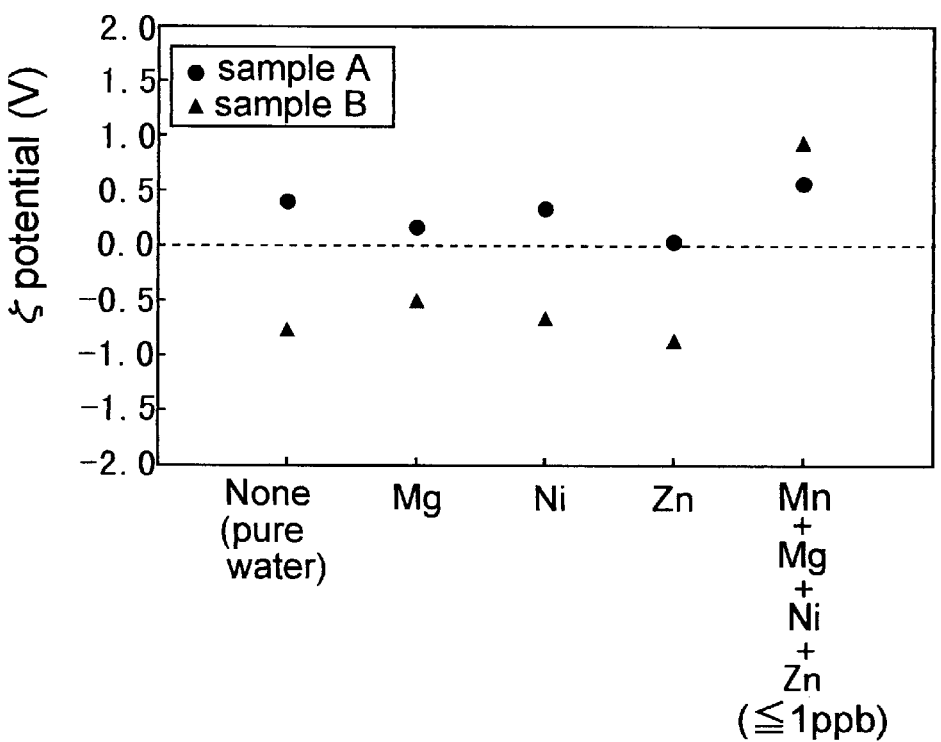
FIG. 5 is a graph showing interfacial electrokinetic potential levels respectively measured for a sample A of the same material as the piping in experiments performed by the test apparatus shown in FIG. 2, and a cobalt oxide sample B, in which the abscissa shows types of substances added to cooling water, and the ordinate indicates zeta potential (V).

The test results obtained by the apparatus shown in FIG. 1 are shown in FIG. 3 and FIG. 4, and the test results obtained by the apparatus shown in FIG. 2 are shown in FIG. 5.

The graph of FIG. 3 shows the total amount of metal ions incorporated in the oxide film on the specimen 15 as a result of experiments performed with the apparatus shown in FIG. 1. Specifically, the concentration of metal elements expelled from the oxide film during sputtering when the surface oxide film on the specimen 15 removed from the autoclave 14 was irradiated with ions, was analyzed by a secondary ion mass spectrometer (SIMS). In FIG. 3, the ordinate shows concentration (wt %) of metal elements from the analytical results, and the abscissa shows sputtering time (min) representing the depth of the oxide film. The significance of "Mg(×20)" and "Zn(×5)" in FIG. 3 is that the measured concentrations were respectively multiplied by 20 and 5, therefore, the actual measured concentrations of Mg and Zn are respectively 1/20 and 1/5 of the concentrations read from FIG. 3. It is seen from FIG. 3 that the four types of metal ions tend to be incorporated in the oxide film of the piping, and that this tendency is especially marked for Mn.

The graph of FIG. 4 shows the amount of cobalt in the oxide film on the specimen 15 which was of the same material as the piping, as a result of various experiments performed with the test apparatus shown in FIG. 1. The ordinate shows cobalt ion concentration (wt %), and the abscissa shows types of metal ions added to the test solution. It is seen from FIG. 4 that the deposition amount of cobalt ion on the piping was very much reduced when two to four types of metal ions including Mn were added together as compared with the case when the metal ions were added separately, and it is also seen that the decrease of cobalt deposition is particularly striking when the four metal ions Mn, Mg, Ni, Zn ($\leq 1$ ppb) were added together.

The graph of FIG. 5 shows measured results of zeta potential for the sample A of the same material as the piping and the cobalt oxide film sample B when metal ions were added to the test solution separately or together in experiments performed using the test apparatus shown in FIG. 2. The ordinate represents zeta potential (V) and the absciisa represents the type of metal ion added. It is seen from FIG. 5 that when a mixture of metal ions is added to the test solution according to this invention, the zeta potential of the cobalt oxide film has the same polarity as that of the zeta potential of the piping material, i.e. it is a positive potential, which is the converse of what is obtained in other cases. It will thus be appreciated that the electrostatic attraction between the piping and the cobalt oxide film particles which both have a positive zeta potential is less than in other cases, and consequently, the deposition of cobalt-containing oxide particles on the piping material surface is inhibited.

From the above experimental results, it is clear that there is a strong tendency for manganese ion to be incorporated in the oxide film, and that this tendency is further enhanced when the manganese is added together with at least one other of the metal ions magnesium, nickel and zinc instead of being added alone. The tendency is particularly strong when the four metal ions manganese, magnesium, nickel and zinc are simultaneously present in the cooling water. In the present invention, the tendency of these metal ions to be incorporated in the oxide film on the surface of structural members in contact with cooling water is remarkably increased by adding a mixture of the metal ions having this type of specific composition to primary cooling water. The composition of the oxide film is thereby controlled, and co-deposition of ionic $^{60}$CO is inhibited. According to the present invention, by arranging that manganese, magnesium, nickel and zinc metal ions are simultaneously present in the cooling water, it is moreover desirable that the interfacial electrokinetic potential (zeta potential) of the oxide film is controlled so that deposition of particulate corrosion products containing $^{60}$Co is also inhibited.

Figure 6:
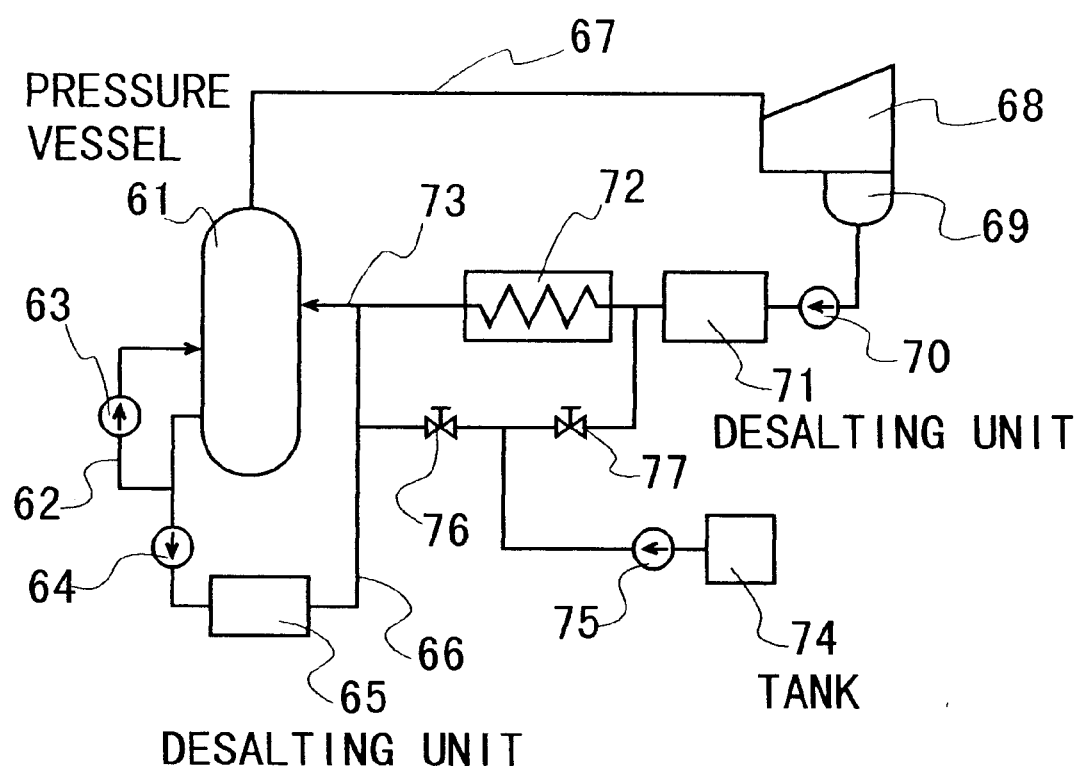
FIG. 6 is a flow diagram schematically showing the structure of a primary cooling water system of a nuclear power plant to which one embodiment of the method of the present invention is applied.

FIG. 6 is a schematic diagram showing a primary cooling system of a boiling water type nuclear power station in which the method for inhibiting deposition of radioactive materials according to one embodiment of the present invention would be applied. As shown in FIG. 6, there are two cooling water recirculation systems, i.e., a reactor water purifying system and a main steam/feed water system, with a reactor pressure vessel 61 as core.

The reactor water purifying system extends from the base of the reactor pressure vessel 61 via a pipe 66 to a feed water pipe 73. This reactor water purifying system comprises the pipe 66, a pump 64 and a desalting unit 65. The recirculation system is formed upstream of the pump 64 by a pipe 62 provided with another pump 63.

The main steam/feed water system extends from the top of the pressure vessel 61 via a main steam pipe 67 to the feed water pipe 73. Steam generated in the pressure vessel 61 is introduced into a turbine 68 via the main steam pipe 67, and after performing work in the turbine 68, it is condensed to water in a condenser 69. The water from this condensation is passed through a desalting unit 71 and heater 72 by a pump 70, and the desalted, heated water is then returned via the feed water pipe 73 to the pressure vessel 61.

In the primary cooling system of this embodiment, the reactor water desalting unit 65 and condensate desalting unit 71 are separately provided for the reactor water purifying system and main steam/feed water system in order to purify the cooling water.

In the method of inhibiting deposition of radioactive materials according to the present invention, the mixture of metal ions is added to the cooling water at a point downstream of the reactor water desalting unit 65 or a point downstream of the condensate desalting unit 71 so that the added metal ions are not decreased by the desalting units.

In the reactor water purifying system, the outlet of a valve 76 is connected to the pipe 66 at a point downstream of the desalting unit 65, and in the main steam/feed water system, the outlet of a valve 77 is connected to the pipe 73 at a point downstream of the desalting unit 71 and upstream of the heater 72. The inlets of these valves 76,77 are connected to the discharge ports of a pump 75, and the pump 75 pressurizes and discharges the solution containing the mixture of metal ions contained in a tank 74. The tank 74 holds a solution comprising a mixture of metal ions of predetermined composition, for example, manganese ion together with magnesium ion and/or nickel ion, manganese ion together with magnesium ion and/or nickel ion plus zinc ion, or all of these four metal ions, the composition of this solution being adjusted according to the purpose. The solution containing this mixture of metal ions is selectively introduced into the reactor water purifying system and/or main steam/feed water system by the controlled action of the pump 75 and opening/closing change-over control of the valves 76,77. It will of course be understood that various solutions containing metal ions can be stored in different tanks, sent to different pumps, and introduced into the cooling water while mixing them together.

Generally, the primary cooling system of a nuclear power station is provided with instruments for analyzing water quality such as electrical conductance meters. In implementing the method of the present invention therefore, the amount of mixed metal ions introduced and the mixing ratios of individual metal ions can be controlled by monitoring based on analytical results obtained for the concentration of each metal ion added to the cooling water.

According to this embodiment, deposition of radioactive materials and especially $^{60}$Co on the surface of the primary coolant structure of the nuclear power plant can be effectively inhibited. As a result, the radiation dose rate to which workers are exposed in performing regular inspections and maintenance when the reactor is shutdown, can be minimized.

The present invention moreover may be applied not only to the primary coolant structure of a boiling water type reactor, but also to that of a pressurized water reactor.

We claim:

1. A method for inhibiting deposition of radioactive materials in the primary coolant structure of a water-cooled nuclear power plant, comprising the steps of:

adding a mixture of metal ions simultaneously containing two to four of the metal ions manganese, magnesium, nickel and zinc, whereof one is manganese, to the cooling water to be introduced into the primary cooling system, and recirculating said cooling water simultaneously containing manganese ion and at least one metal ion selected from a group consisting of magnesium ion, nickel ion and zinc ion, into the primary coolant structure.

2. A method according to claim 1, wherein the mixture of metal ions added to said cooling water simultaneously comprises the three metal ions manganese ion, magnesium ion and nickel ion.

3. A method according to claim 1, wherein said manganese ion is $^{55}$Mn ion, said Magnesium ion is $^{26}$Mg ion, and said nickel ion is $^{58}$Ni ion.

4. A method according to claim 1, wherein said structure comprises a member made of zinc, zinc alloy or a material which contains zinc, and the zinc ion contained in said cooling water is zinc ion which has dissolved in the cooling water from said member.

5. A method according to claim 1, wherein the mixture of metal ions added to said cooling water contains zinc ion, and preferably $^{64}$Zn ion.

6. A method according to claim 1, wherein the concentration of zinc ion and preferably $^{64}$Zn ion in the primary cooling water is limited to a maximum of 1 ppb.

7. A method according to claim 1, wherein the total amount of mixed metal ions in the primary cooling water is limited to within a range of 5 to 50 ppb.

8. A method according to claim 7, wherein the concentration of zinc ion and preferably $^{64}$Zn ion in the primary cooling water is limited to a maximum of 1 ppb.

9. A method for inhibiting deposition of radioactive materials and especially $^{60}$Co in the primary coolant structure of a water-cooled nuclear power plant, comprising the steps of:

adding a mixture of metal ions simultaneously containing manganese ion, magnesium ion, nickel ion and optionally zinc ion, to the cooling water introduced into the primary cooling system, recirculating said cooling water simultaneously containing $^{55}$Mn ion, $^{26}$Mg ion, $^{58}$Ni ion and $^{64}$Zn ion, into the primary coolant structure, limiting the total amount of mixed metal ions in the primary cooling water to within a range of 5 to 50 ppb, and limiting the concentration of $^{64}$Zn ion in the primary cooling water to a maximum of 1 ppb.

* * * * *